United States Patent Office
3,496,143
Patented Feb. 17, 1970

3,496,143
PROCESS FOR SHEET FORMING POLYETHYLENE TEREPHTHALATE
Erhard Siggel, Seckmauern, and Walter Rein, Obernburg, Germany, assignors to Glanzstoff A.G., a corporation of Germany
No Drawing. Filed Dec. 1, 1965, Ser. No. 510,952
Claims priority, application Germany, Dec. 3, 1964, V 27,282
The portion of the term of the patent subsequent to Feb. 25, 1986, has been disclaimed
Int. Cl. C08g 53/14, 53/16
U.S. Cl. 260—75                                    9 Claims

ABSTRACT OF THE DISCLOSURE

Process for the vacuum deep-drawing of a polyethylene terephthalate sheet material which must have a solution viscosity of above 1.7 to about 2.0, measured as a 1% solution in meta-cresol at 25° C., and a degree of crystallization of at least 5% up to about 25%, wherein the polyethylene terephthalate sheet is first heated to a temperature between about 85° C. and 200° C., the sheet is then shaped by vacuum deep-drawing onto the mold surface and the resulting shaped sheet is then further heat treated while on the mold surface at a temperature between about 140° C. and 220° C. for a period of time sufficient to produce a degree of crystallinity which is higher than 25%. The heat treatment of the shaped sheet on the mold surface is preferably higher than the temperature to which the sheet is heated prior to shaping. The resulting three-dimensional polyethylene terephthalate shaped product exhibits improved properties, including an especially high tensile strength while maintaining a high degree of impact resistance in spite of the greater crystallinity.

---

This invention relates to a process for the sheet forming of polyethylene terephthalate and more particularly to the vacuum deep-drawing of a polyethylene terephthalate sheet into a molded product which is distinguished by its especially valuable physical properties and very good dimensional stability at elevated temperatures.

It is known that polyethylene terephthalate can be molded quite readily by heating it in molten form, shaping the melt in a mold or through an extrusion die, and then permitting it to harden into the desired form. Polyethylene terephthalate is thus most widely used in forming synthetic filaments, foils or films, where the extruded polyester can be mono-axially or biaxially oriented so as to obtain the desired physical properties in these types of products. When molding or shaping polyethylene terephthalate into shaped bodies of three dimensions, it becomes much more difficult to achieve a satisfactory product.

For example, when using polyethylene terephthalate in an injection molding process, the polyester tends to be degraded or decomposed so as to reduce the degree of polymerization and consequently impair the quality of the molded product. This unavoidable decomposition of the polyester is revealed, for example, by a decline in the solution viscosity of the molded product by comparison with the initial polyethylene terephthalate prior to molding. Decomposition reactions are most evident with higher degrees of polymerization, i.e. higher solution viscosities of the initial polyester, but, on the other hand, a high degree of polymerization is precisely that which is most often desired in order to achieve satisfactory and sometimes essential properties of three dimensional molded bodies.

Moreover, molding the polyethylene terephthalate by shaping from the melt has the drawback that during melting the polyester is completely transformed into the amorphous state. Therefore, after the melt has hardened in the mold, it still consists practically only of amorphous material which does not have satisfactory physical properties and which exhibits an especially poor dimensional stability when heated.

One object of the present invention is to provide a method of sheet forming polyethylene terephthalate in order to achieve improved physical properties, including very good properties of tensile strength, elongation, hardness and especially impact toughness. Another object of the invention is to provide a sheet-formed polyethylene terephthalate product with three dimensional stability even when subjected to heat for relatively long periods of time. These and other objects and advantages of the invention will become more apparent upon consideration of the following detailed specification.

It has now been found, in accordance with the invention, that a highly improved polyester molded product is obtained in a process of vacuum deep-drawing a sheet of polyethylene terephthalate onto a mold surface by heating a sheet of polyethylene terephthalate, which must have a solution viscosity of about 1.7 to 2.0 and a degree of crystallization of at least 5% up to about 25%, to a temperature between about 85° C. and 200° C., then shaping the heated sheet on the mold surface and further heat treating the resulting shaped sheet while on the mold surface at a temperature between about 140° C. and 220° C., preferably at a higher temperature than that to which the sheet is heated just prior to shaping. With this heat treatment at a temperature above the sheet forming temperature, the dimensional stability of the molded polyester product is especially promoted so as to achieve excellent heat stability.

Especially reliable operation of the process and optimum properties of the sheet formed polyester are achieved by using an initial ployethylene terephthalate sheet having a solution viscosity of 1.7 to 2.0 and a crystallization degree between about 8 and 20% which is heated to a temperature between about 900° C. and 160° C., shaped on the mold surface by the vacuum deep-drawing process and then heat treated as noted above, i.e. preferably at a temperature higher than the sheet forming temperature.

The polyethylene terephthalate sheet material employed in the vacuum deep-drawing process of the invention may be a relatively thin film or foil or a thicker plate-like sheet. Suitable polyester sheets are those having a thickness of about 0.1 to 6 mm. The process yields especially advantageous results when applied to polyethylene terephthalate sheets with a thickness of about 1 to 3 mm. It is also possible of course, to use polyethylene terephthalates which contain various additives such as matting or delustering agents, dyes, pigments or other substances, including light-stabilizing and heat-stabilizing agents.

It is essential that the polyethylene terephthalate sheet to be molded have a solution viscosity of about 1.7 to 2.0 and a crystallization degree of at least 5% up to about 25%. The solution viscosity, sometimes referred to as the relative viscosity is measured for purposes of definition herein as a 1% solution of the polyethylene terephthalate in meta-cresol at 25° C. The production of initial polyethylene terephthalate sheets of varying degrees of crystallization is well known, and the exact degree of crystallization can be easily determined by measuring the specific gravity of the polyester and converting to the directly proportional value of the crystallization degree. This conversion is illustrated by the following table.

TABLE

Relation between density and degree of crystallization of polyethylene terephthalate.

| Density at 25° C.: | Degree of crystallization, percent |
| --- | --- |
| 1.336 | 5 |
| 1.342 | 10 |
| 1.348 | 15 |
| 1.354 | 20 |
| 1.360 | 25 |
| 1.366 | 30 |
| 1.372 | 35 |
| 1.378 | 40 |
| 1.384 | 45 |
| 1.390 | 50 |
| 1.396 | 55 |
| 1.402 | 60 |

It will be apparent from the table that there is a simple linear relationship whereby a change of 5% in crystallization degree corresponds to a change of density of 0.006.

In order to heat the polyethylene terephthalate to the sheet forming or shaping temperature, any conventional heating means suitable for vacuum drawing can be used and especially radiant infrared heaters which provide a rapid and uniform heating over the entire cross-section of the polyester sheet material. The initial sheet can be heated rapidly with a large supply of heat or slowly with a reduced intensity of radiation. Optimum conditions can be readily determined in each case by determining the operating parameters in a preliminary test.

In this heating of the intial polyester sheet to the shaping temperature of 85–200° C., it is quite essential to begin with a degree of crystallization of at least 5% and not more than about 25%. In this connection, a polyester with a solution viscosity above 1.7 offers the advantage that further crystallization during the initial heating step is retarded sufficiently to permit easy handling or control of this step. Relatively thin films or foils can be heated to the shaping temperature within a few seconds while thicker sheets or plates require a correspondingly longer period of time.

If the initial polyester sheet has a degree of crystallization above 25%, it is not feasible or practical to form it by vacuum deep-drawing since a complete tearing or partial separation of the sheet often occurs during the drawing or shaping step. On the other hand, an initial crystallization degree of less than 5% must also be avoided if one is to achieve the desired properties in the finished product.

The shaping or forming step of the invention is carried out according to the known methods of vacuum deep-drawing as discussed in detail by A. Thiel in "Grundzüge der Vakuumverforming," Speyer (1963), using conventional vacuum sheet forming apparatus. No special techniques are required for the deformation of the heated polyester sheet under vacuum pressure onto the mold surface, e.g. there is no need to combine a positive air pressure simultaneously with the vacuum pressure since a pressure of up to 760 mm. Hg is sufficient (max. vacuum) for purposes of this invention. The process of the invention is readily carried out with either negative or positive procedures, e.g. by using male or female molds, and it is also possible to prestretch the heated polyester sheet by conventional pneumatic or mechanical means so as to shorten the path or distance through which the polyester must be drawn by the application of a vacuum.

These and similar modifications of vacuum forming processes can be readily selected by one skilled in this art.

For purposes of the present invention, one should employ a draw ratio, i.e. the ratio of height to width during vertical drawing, of at least about 0.001 up to about 2.5 and preferably 0.01 to 1. Relatively high ratios of height to width can best be achieved where there is a mechanical prestretching before the vacuum drawing step, e.g. as in the so-called "drape forming" technique.

After the deep-drawing step and while the formed sheet is still on the mold surface, preferably with the continued presence of the vacuum, the shaped article is subjected to a heat treatment at a temperature of about 140° C. to 220° C. By applying the vacuum to one side of the shaped polyester sheet during this heat treatment, it is possible to produce a molded product having especially fine or sharply outlined contours. It is particularly desirable, in order to ensure a dimensionally-stable, heat-resistant molded article, to carry out the heat treatment at a temperature which is higher than the forming or shaping temperature.

When heat-treating very thin films or foils after shaping, the time required for this treatment in the mold at 140–220° C. can be quite short. However, it is generally desirable to conduct the heat treatment for a period of time sufficient to produce a degree of crystallinity in the finished product which is higher than 25%, preferably at least about 30% up to 50% or more, the maximum attainable crystallization for polyethylene terephthalate being about 60%. In general, especially good results have been observed when this heat treatment step is carried out for a period of about 30 to 600 seconds. The upper limit of this treatment is not particularly critical, other than from an economical viewpoint, and a duration of treatment of up to 100 minutes is possible. After the heat treatment is concluded, the finished product can be removed from the mold and cooled. At high temperatures of the heat treatment, it may often be desirable to cool the molded product before removal from the mold.

The crystallization of the product imparted by the heat treatment can be adjusted within desired values by proper selection of the temperature between 140° C. and 220° C. since the attainable degree of crystallization generally depends only on the temperature selecetd in each case, higher temperatures yielding a higher crystallization. However, it was also found that the attainable degree of crystallization is also dependent to a lesser extent on the molecular weight of the polyethylene terephthalate, i.e. its solution viscosity. Thus by varying the solution viscosity within the limits of the invention, it is possible to further vary the crystallization degree attainable at a chosen temperature of heat treatment by 5 to 6%.

The invention is further illustrated by the specific methods described in the following examples, it being understood that the invention is not limited to these examples.

EXAMPLE 1

A 3 mm. thick plate of polyethylene terephthalate (solution viscosity of 1.85) having rectangular dimensions of 370 x 280 mm. was placed in a vacuum deep-drawing apparatus of the make identified as Illig Type U60. The heat radiating element of the apparatus was brought to a distance of 200 mm. from the polyethylene terephthalate plate, and the power of the heating element was set at 4300 watts. At three different positions of the plate, thermocouples were introduced and the heating of the plate through the action of the heating element was followed in point of time. There was thus obtained a calibration curve which provides the mean plate temperature after a specific heating time. In like manner it is possible to determine working parameters for other intensities of heating and other plate thicknesses.

A polyethylene trephthalate plate having the same dimensions as that described above was heated in the same apparatus to a temperature of 130° C., for which purpose 125 seconds of heating time were necessary. A determination of the degree of crystallization after this heating step yielded a value of about 18%. The heating system was then switched off and the heated plate was immediately deep-drawn by application of a vacuum of 25 mm. Hg over a mold on which the plate was thus formed as a rectangular shell of 250 x 150 mm. in length and width and a depth of 85 mm. The deep-drawing ratio thus amounted to 0.34. Under maintenance of the vacuum, a heat treatment was begun at about 150° C. and continued at this temperature by intermittently switching on and off the heating system of the apparatus. After a treatment time of 550 seconds, the heating elements were switched off and the molded body taken out. There was determined a crystallization degree of 30% in the finished product. The impact strength was tested according to DIN-specification 53453, but no breakage occurred even after a load of over 200 kg. cm./cm.$^2$ had been applied. The tensile strength was 800 kg./cm.$^2$ at 15% elongation, and the ball hardness according to DIN-specification 53456 (draught) amounted to 1420 kg./cm.$^2$. The molded shell was heated for 60 minutes at 160° C. for testing its dimensional stability and proved to be fully stable.

EXAMPLE 2

In the same vacuum deep-drawing machine designated as Illig U60 and after determining the working parameters, a polyethylene terephthalate plate with a solution viscosity of 1.74 and the same rectangular dimensions as in Example 1 but with a thickness of 2 mm. and a degree of crystallization of 8% was heated to 95° C., and formed by following the pneumatic positive-stretch molding procedure. For this purpose, there was used a mold core in the form of a round funnel with the following dimensions: maximum diameter=150 mm., minimum diameter=20 mm. and funnel length=150 mm. The mold was driven against the polyethylene terephthalate plate and the plate was thereby pneumatically pre-stretched.

Molding was completed by application of a vacuum of 50 mm. Hg and immediately followed by a heat treatment carried out for 400 seconds at 180° C. The draw ratio in this example was 1:1. Nevertheless, the resulting molded body was free of inner stresses and very dimensionally stable even when heated.

By carrying out other examples similar to those described above, it was observed that the degree of crystallization does not decrease during vacuum deep-drawing at the prescribed forming temperatures and that by using an initial polyester sheet with 5-25% crystallization, a further crystallization takes place in the heat treatment step over a relatively short period of time. Higher heat treatment temperatures and/or longer duration of such treatment promote the desired increase in crystallinity over that of the original flat sheet. By comparison, if the polyester is drawn or molded in an amorphous form, then a long induction time would be required to form the first crystal nuclei and high degrees of crystallization cannot be easily obtained. This rapid increase in the degree of crystallization of the formed article in the mold is therefore a particularly desirable feature of the invention. If less than 5% of the initial polyester is crystalline, then this advantage is not particularly evident.

It was further found that in using the process of the invention, the inner stresses or tensions of the molded piece arising from the deep drawing step are completely balanced and the crystallization closely approaches that which can be achieved under normal crystal growth at the particular temperature in question. In this crystallized state, the finished molded polyester product is dimensionally stable and capable of withstanding relatively high temperatures up to 180° C. even over a long period of time. Of course, where the molded article is to be exposed to such extreme conditions, it is desirable to add an antioxidant to the polymer.

No decomposition reactions occur during the process of the invention whereby the physical properties of the molded product might be seriously impaired. Thus, the polyethylene terephthalate of the finished molded product has the same degree of polymerization, measured by its solution viscosity, as the initial polyester sheet. As compared to amorphous injection molded products, the vacuum formed products of the present invention are not amorphous but actually have a higher degree of crystallinity than the initial material being molded.

Thus, the molded polyester products obtained by the process of the invention can exhibit a crystallization degree as high as 50% or more. It is well known that a high impact strength is highly desirable in many possible uses of molded articles. However, it has generally been noted that the impact strength of polyethylene terephthalate decreases rapidly as the degree of crystallization increases. Thus, while molded objects of the amorphous polyester exhibit very high impact resistance, the highly crystalline polyesters prepared according to known procedures have a relatively low impact strength and are so brittle or friable that they tend to burst under high loads.

By comparison, the molded crystalline products of the present invention, as prepared from polyethylene terephthalate with a solution viscosity of 1.7 to 2.0, have a surprisingly high impact strength which in fact is nearly equal to that of amorphous products. At the same time the products of this invention have a tensile strength which is very nearly twice as high as that of molded bodies of the amorphous polyester. Also, molded products prepared according to this invention have a considerably increased elongation and especially good hardness. These enhanced properties of the new polyester products are obtained without any impairment of other properties normally associated with polyethylene terephthalate, such as good electrical properties, excellent stability to chemicals and high resistance to weathering.

The invention is hereby claimed as follows:

1. A process for forming a sheet of polyethylene terephthalate by vacuum deep-drawing of the sheet onto a mold surface, said process comprising:
   heating a sheet of polyethylene terephthalate, which has a solution viscosity of above 1.7 to about 2.0, measured as a 1% solution in meta-cresol at 25° C., and a degree of crystallization of at least 5% up to about 25%, to a temperature between about 85° C. and 200° C.;
   shaping the heated sheet by said vacuum deep-drawing onto the mold surface; and
   further heat treating the resulting shaped sheet while on the mold surface at a temperature between about 140° C. and 220° C. and for a period of time sufficient to produce a degree of crystallinity which is higher than 25%.

2. A process as claimed in claim 1 wherein the temperature of the heat treatment of the shaped sheet on the mold surface is higher than the temperature to which the sheet is heated prior to shaping.

3. A process as claimed in claim 1 wherein said polyethylene terephathalate sheet has a degree of crystallization of about 8 to 20% and is heated for shaping at a temperature between about 90° C. and 160° C.

4. A process as claimed in claim 3 wherein the temperature of the heat treatment of the shaped sheet on the mold surface is higher than the temperature to which the sheet is heated prior to shaping.

5. A process as claimed in claim 1 wherein said heat treatment of the shaped sheet on the mold surface is carried out for a period of about 30 to 600 seconds.

6. A process as claimed in claim 1 wherein the vacuum which is applied to shape the sheet on the mold surface is maintained during said heat treatment.

7. A process as claimed in claim 1 wherein the polyethylene terephthalate sheet to be shaped has a thickness of about 0.1 to 6 mm.

8. A process as claimed in claim 1 wherein the polyethylene terephthalate sheet to be shaped has a thickness of about 1 to 3 mm.

9. The polyethylene terephthalate molded product obtained by the process of claim 1.

References Cited

UNITED STATES PATENTS

| | | | |
|---|---|---|---|
| 2,823,421 | 2/1958 | Scarlett | 264—289 X |
| 2,911,681 | 11/1959 | Distler | 264—292 |
| 3,165,499 | 1/1965 | Alles. | |
| 3,177,277 | 4/1965 | Adams et al. | |
| 3,257,489 | 6/1966 | Heffelfinger | 264—95 X |
| 3,264,157 | 8/1966 | Lattimer | 264—92 X |

ROBERT F. WHITE, Primary Examiner

T. J. CARVIS, Jr., Assistant Examiner

U.S. Cl. X.R.

264—92, 292, 345

PO-1050
(5/69)

UNITED STATES PATENT OFFICE
CERTIFICATE OF CORRECTION

Patent No. 3,496,143            Dated February 17, 1970

Inventor(s) Erhard Siggel et al

It is certified that error appears in the above-identified patent and that said Letters Patent are hereby corrected as shown below:

Column 2, line 44, "ployethylene" should read --polyethylene--; line 47, "900° C." should read "90° C.".

Column 4, line 73, "trephthalate" should read --terephthalate--.

SIGNED AND
SEALED

JUN 3 0 1970

(SEAL)
Attest:

Edward M. Fletcher, Jr.
Attesting Officer

WILLIAM E. SCHUYLER, JR.
Commissioner of Patents